United States Patent [19]

Walle et al.

[11] Patent Number: 4,729,601
[45] Date of Patent: Mar. 8, 1988

[54] INTERLOCKING DEVICE FOR AIRCRAFT EXECUTIVE SEATS

[75] Inventors: Irwin Walle, Clearwater; Donald C. Fetterhoff, St. Petersburg; William R. Higgins, Clearwater, all of Fla.

[73] Assignee: ATR International, Inc., Clearwater, Fla.

[21] Appl. No.: 31,075

[22] Filed: Mar. 26, 1987

[51] Int. Cl.⁴ .................................................. B64D 11/06
[52] U.S. Cl. .................................... 297/344; 297/346; 297/349
[58] Field of Search ................... 297/349, 344, 346; 248/424

[56] References Cited

U.S. PATENT DOCUMENTS

| | | | |
|---|---|---|---|
| 4,487,452 | 12/1984 | Tanizaki et al. | 297/349 |
| 4,570,997 | 2/1986 | Tanizaki et al. | 297/349 |
| 4,588,226 | 5/1986 | Young et al. | 297/349 |
| 4,625,934 | 12/1986 | Ryan | 297/344 |
| 4,671,572 | 6/1987 | Young et al. | 297/349 |
| 4,674,713 | 6/1987 | Ryan et al. | 297/344 X |
| 4,682,561 | 7/1987 | Jentry | 297/349 |

*Primary Examiner*—Peter A. Aschenbrenner
*Attorney, Agent, or Firm*—Herbert W. Larson; Joseph C. Mason, Jr.

[57] ABSTRACT

A seat adjustment and locking mechanism employs a pedestal permanently affixed to the deck and having a bore on its top frame member to engage a through bolt. The bolt supports a pin pad with a multiplicity of small pins on its top surface. A seat frame bottom wall containing a slot moves around the bolt and pin pad. A panel containing small holes is located within the seat frame. In a relaxed position the panel rests on the pin pad and causes engagement of the pins with the holes on the bottom surface of the panel to secure the seat in a locked position.

14 Claims, 7 Drawing Figures

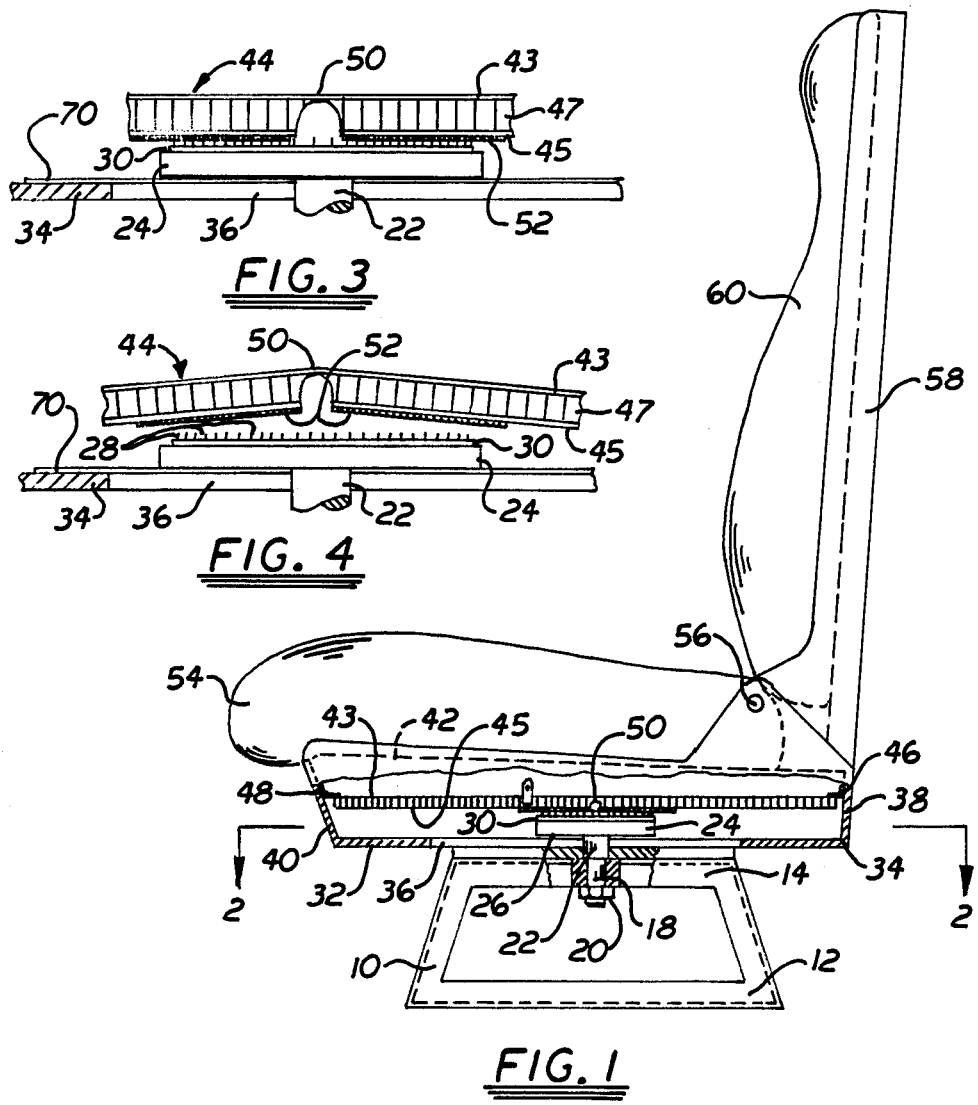
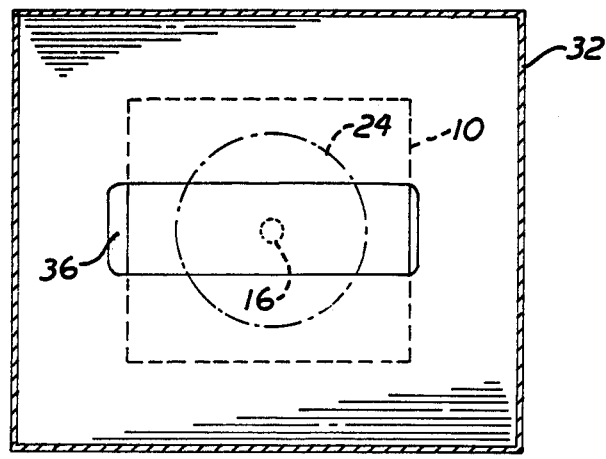

4,729,601

INTERLOCKING DEVICE FOR AIRCRAFT EXECUTIVE SEATS

BACKGROUND OF THE INVENTION

1. Field of the Invention

This invention relates to a locking device for aircraft executive seats. More particularly, it refers to a device for locking an aircraft executive seat which is maneuverable in several directions into a safe locked position during take-off and landing.

2. Description of the Prior Art

Aircraft executive seats are required to be maneuverable in all lateral planes and to rotate at least 180 degrees as seen in U.S. Pat. No. 4,588,226. This is normally accomplished by mounting the seat on tracks for lateral movement and on a central shaft for rotation as seen in U.S. Pat. Nos. 4,210,303 and 3,853,298. Another method is to mount the seat on a sliding surface which permits all of the movement required. In both cases the seats must be locked into position when not being manipulated and this is a function of plungers, brakes or clutches as seen in U.S. Pat. Nos. 3,355,211 and 3,136,524.

There are various objections to these methods, notably the looseness associated with conventional plungers in holes, and the spring forces required for brakes or clutches. The paramount weakness is in the springs to position and hold the mechanical parts in the locked condition. A malfunction in the spring action results in the seat not being locked and therefore presenting a serious safety hazard.

SUMMARY OF THE INVENTION

We have provided a locking mechanism which may be used with any maneuvering system and which does not permit any loose movement of the seat in the locked position. Furthermore, it does not rely on spring pressure for the holding force. The mechanism has a large number of pins on one surface interlocking with corresponding receiver apertures on a second surface. The pins are of very small diameter but, when interlocked in the receiver apertures, present a combined mass resisting any lateral force. At the same time the pins present no resistance to a separating force at 90 degrees to the lateral plane. In this manner the locking action is achieved by moving the two elements together and unlocking by moving them apart by a lever.

The dimensions of the pins and apertures are suitable for interlocking in any lateral position without undue deviation from the required setting. This entails some flexibility in both the pin and the apertures. A chamfer or bevel on the lead surface of the aperture containing surface aids smooth movement of the parts.

BRIEF DESCRIPTION OF THE DRAWINGS

The present invention may be best understood by those having ordinary skill in the art by reference to the following detailed description when considered in conjunction with the accompanying drawings in which:

FIG. 1 is a partially cutaway section view in elevation of a seat locking mechanism according to this invention.

FIG. 2 is a plan view along line 2—2 of FIG. 1
FIG. 3 is a section view of a locked mechanism.
FIG. 4 is a section view of an unlocked mechanism.

DETAILED DESCRIPTION OF THE INVENTION

Figure 5:
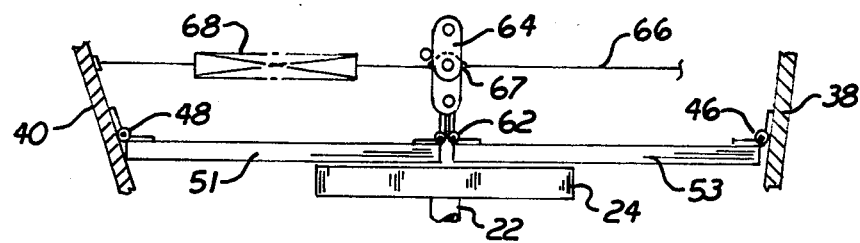
FIG. 5 is a locked lever assembly view in elevation.

Throughout the following detailed description the same reference numerals refer to the same elements in all figures.

The seat adjustment and locking mechanism is seen in FIG. 1 where a pedestal 10 supports the mechanism. The pedestal 10 is securely attached to the deck at its base 12 by bolts or rivets. The top 14 frame member of the pedestal 10 contains a bore 16 through which a bolt 18 is secured at a first end with a nut 20. A pin plate shaft 22 encloses a second end of bolt 18 and is secured to pin pad 24 at its underneath surface 26. The pin pad 24 is made of steel, aluminum or a high density strengthened polymer.

The pin pad 24 has a multitude of pins 28 at approximately right angles to the pin pad 24 top surface 30. The pins can be located on several sections of the pin pad 24 and the pins on each section can be slightly angled up to 15 degrees from their upright position.

Pedestal 10 also supports a seat frame 32 having a bottom wall 34 with a central opening 36 over the pedestal bore 16. The bottom surface of bottom wall 34 can have a non-stick surface 70 such as TEFLON® to promote movement over the top of the pedestal 10. The seat frame 32 also has a back wall 38 and a front wall 40 together with top wall 42.

A substantially planar panel 44 is positioned approximately intermediate to the top wall 42 and bottom wall 34. It is hinged at a first end to front wall 40 by hinge 48 and at a second end to back wall 38 by hinge 46. The planar panel 44 is bendable at its mid-section 50. The planar panel 44 can be made of a honeycomb layer 47 between a top 43 and bottom 45 firm membrane on each side.

Affixed to the bottom 45 of the panel 44 is a multiplicity of holes suitable to receive the pins 28 on the top surface 30 of the pin pad 24.

The pin pad 24 supported on bolt 18 is located above the hole 36 in bottom wall 34. Movement of seat frame 32 is confined to the rectangular configuration of hole 36 since the bolt 18 and the pivot shaft 22 confine the movement of the seat frame to the dimensions of slot 36. Free movement is allowed by the alignment of elements seen in FIG. 4. When the panel 50 is completely planar the pins 28 in the pin pad 24 engage the holes 52 in the panel 44 to prevent any movement of the seat.

Above seat frame 32 is a standard cushion 54. Hinged to the seat frame at pivot point 56 is a backrest member 58, also having a cushion 60.

Figure 6:
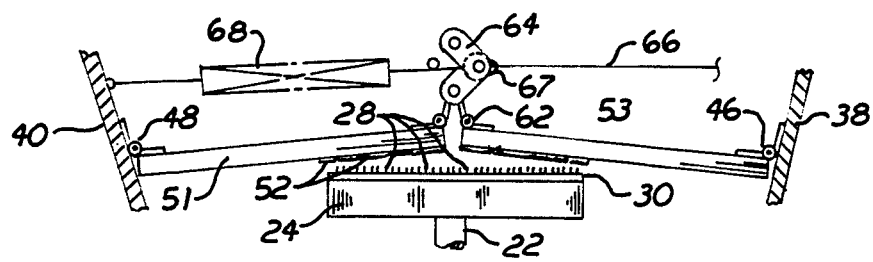
FIG. 6 is an unlocked lever assembly view in elevation.

The planar panel 44 can be divided into two contiguous components 51 and 53 as seen in FIG. 6. These components can be hinged together by hinge 62. In any event, a mechanism such as hinge 62 must be attached above bending point 50 on panel 44 to lift panel 44 or panel sections 51 or 53 away from the pin pad 24 in order to allow for movement of the seat frame 32.

Figure 7:
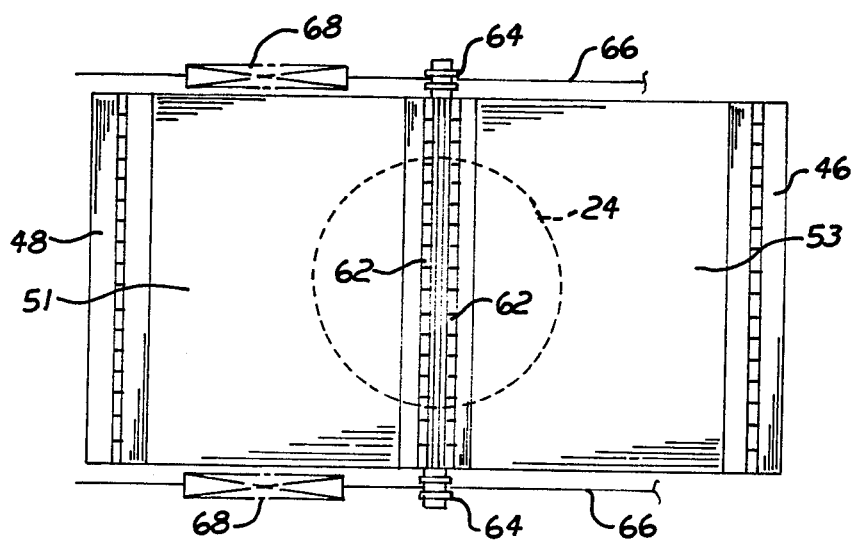
FIG. 7 is a plan view of the lever assembly.

One preferred method of lifting the panel 44 is seen in FIGS. 5-7 wherein a toggle 64 is attached to the hinge 62. A cable 66 attached to eye 67 is pulled by a side lever (not shown) affixed to the exterior side of the seat frame 32. When the lever is not pulled, the return spring 68 reseats the panel 44 or 51 and 53 over the pin pad 24 and thereby engages the pins 28 into the holes 52 to securely mount the seat frame 32 over the pedestal.

It can be understood that the present invention describing a safe and efficient locking mechanism for swivel chairs can be made using equivalent parts without departing from the basic inventive concept.

Having thus described the invention, what is claimed and desired to be secured by Letters Patent is:

1. A seat adjustment and locking mechanism comprising:
    (a) a seat supporting stationary pedestal having a bore through a top frame member,
    (b) a seat frame mounted over the pedestal,
    (c) the seat frame having a bottom wall provided with an opening over the pedestal bore, front and back walls and a top wall,
    (d) a pin pad having a diameter larger than the width of the opening in the bottom wall, the pin pad juxtaposed to a shaft, the shaft protruding downwardly through the opening in the bottom wall and the pedestal bore, the shaft being affixed to the pedestal at an end distal from the pin pad,
    (e) a substantially planar panel having a top and bottom surface, the panel positioned between the bottom and top seat frame walls, the panel hinged at a first end to the front wall and at a second end to the back wall of the seat frame, the panel being bendable at a midsection,
    (f) a multiplicity of holes on at least one grating affixed to the bottom surface of the panel to receive corresponding pins from a top surface of the pin pad, and
    (g) means for lifting the panel to retract the holes on the grating from the pins so that the seat frame is movable within the dimensions of the opening in the bottom wall.

2. The seat adjustment and locking mechanism according to claim 1 wherein the opening in the bottom wall of the seat frame is rectangular in shape.

3. The seat adjustment and locking mechanism according to claim 1 wherein the pin pad is a circular metal plate having a multiplicity of pins upwardly directed from the top surface of the plate.

4. The seat adjustment and locking mechanism according to claim 3 wherein the pins are upwardly directed at an angle of about 15 degrees from the top surface of the plate.

5. The seat adjustment and locking mechanism according to claim 1 wherein the panel consists of two sections joined together with a hinge to form the bendable midsection.

6. The seat adjustment and locking mechanism according to claim 1 wherein the panel is a honeycomb layer between a firm membrane on each side.

7. The seat adjustments and locking mechanism according to claim 5 wherein the two panel sections are each a honeycomb layer between a firm membrane on each side.

8. The seat adjustment and locking mechanism according to claim 1 wherein the means for bending the panel is a toggle affixed to a top surface of the panel midsection with a spring return cable pulling a middle of the toggle to lift the midsection of the panel.

9. The seat adjustment and locking mechanism according to claim 5 wherein the means for bending the panel is a toggle affixed to the hinge over the pin pad which is connected to a spring return cable.

10. A seat adjustment and locking mechanism comprising:
    (a) a seat frame supporting stationary member affixed to the deck of an aircraft,
    (b) a seat frame having a bottom wall provided with an opening, a front and back side wall and top wall,
    (c) a shaft mounted at a first end to the seat supporting member and at a second end to a pin pad above the bottom wall, the pin pad having a diameter greater than at least one dimension of the central opening,
    (d) a panel having a top and bottom surface mounted between the top and bottom wall of the seat frame by hinging at a first end to the front wall and at a second end to the back wall, the panel being liftable at about a midpoint between the first and second end,
    (e) a multiplicity of apertures on the bottom surface of the panel receiving a corresponding multiplicity of upright pins located on a top surface of the pin pad when the panel is substantially planar to lock the seat frame in a fixed position, and
    (f) means for lifting the panel at its midpoint.

11. A seat adjustment and locking mechanism according to claim 10 wherein the means for lifting the panel is a toggle affixed to the top surface of the panel with a spring return cable pulling a middle of the toggle.

12. A seat adjustment and locking mechanism according to claim 10 wherein the panel is a honeycomb layer between a firm membrane on each side.

13. A seat adjustment and locking mechanism according to claim 10 wherein it consists of two sections joined together at the midpoint by a hinge.

14. A seat adjustment and locking mechanism according to claim 10 wherein a bottom surface of the seat frame bottom wall has a non-stick surface.

* * * * *